(12) United States Patent
Fujita et al.

(10) Patent No.: US 9,220,098 B2
(45) Date of Patent: *Dec. 22, 2015

(54) RADIO RESOURCE ALLOCATION METHOD AND TELECOMMUNICATION APPARATUS

(71) Applicant: FUJITSU LIMITED, Kawasaki-shi, Kanagawa (JP)

(72) Inventors: Hiroshi Fujita, Kawasaki (JP); Yoshiharu Tajima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/938,501

(22) Filed: Jul. 10, 2013

(65) Prior Publication Data

US 2013/0301572 A1    Nov. 14, 2013

Related U.S. Application Data

(63) Continuation of application No. 12/000,782, filed on Dec. 17, 2007, now Pat. No. 8,514,788, which is a continuation of application No. PCT/JP2005/012643, filed on Jul. 8, 2005.

(51) Int. Cl.
*H04W 4/00* (2009.01)
*H04W 72/04* (2009.01)
*H04W 72/06* (2009.01)

(52) U.S. Cl.
CPC ............ *H04W 72/044* (2013.01); *H04W 72/06* (2013.01)

(58) Field of Classification Search
CPC ........... H04W 72/044; H04W 72/0453; H04L 5/0035

USPC .......................................................... 370/329
See application file for complete search history.

(56) References Cited

U.S. PATENT DOCUMENTS 6,157,627 A    12/2000  Olofsson et al.
6,396,853 B1   5/2002   Humphrey et al.
(Continued)

FOREIGN PATENT DOCUMENTS

JP    2001-244913    9/2001
JP    2002-505065    2/2002
(Continued)

OTHER PUBLICATIONS

Dunlop, J. et al., "Block Reservation Multiple Access for 3rd Generation Cellular Systems", Universal Personal Communications, Personal Communications: Gate Way to the 21st Century . Conference Record, 2nd International Conference on Ottawa, ONT., Canada, Oct. 12-15, 1993, New York, NY, IEEE, vol. 1, pp. 18-22.

(Continued)

*Primary Examiner* — Shaq Taha
(74) *Attorney, Agent, or Firm* — Fujitsu Patent Center

(57) ABSTRACT

A radio resource allocation method for use in a radio telecommunication system for a first radio telecommunication apparatus and a second telecommunication apparatus carrying out a radio telecommunication by using an allocated radio resource, comprising selecting a resource allocation pattern identifying a combination of radio resources allocatable within a resource management space from among a pre-prepared plurality of resource allocation patterns, and notifying the second radio telecommunication apparatus of pattern identifier information identifying the selected resource allocation pattern and of startup position information thereof within the resource management space.

2 Claims, 22 Drawing Sheets

(56) References Cited

U.S. PATENT DOCUMENTS

| | | | |
|---|---|---|---|
| 6,597,671 B1* | 7/2003 | Ahmadi et al. | 370/329 |
| 6,748,220 B1* | 6/2004 | Chow et al. | 455/450 |
| 7,328,025 B2 | 2/2008 | Jechoux | |
| 7,385,943 B2 | 6/2008 | Nidda | |
| 7,453,854 B2* | 11/2008 | Fujishima et al. | 370/335 |
| 7,787,492 B2 | 8/2010 | Timus et al. | |
| 8,274,880 B2* | 9/2012 | Zhang et al. | 370/208 |
| 8,355,748 B2* | 1/2013 | Abe et al. | 455/552.1 |
| 2002/0159470 A1 | 10/2002 | Atarashi et al. | |
| 2002/0176398 A1* | 11/2002 | Nidda | 370/347 |
| 2003/0035393 A1 | 2/2003 | Sinnarajah et al. | |
| 2003/0142694 A1 | 7/2003 | Takano | |
| 2004/0151208 A1 | 8/2004 | Maupin | |
| 2005/0259583 A1* | 11/2005 | Froc et al. | 370/235 |
| 2005/0265222 A1 | 12/2005 | Gerlach | |
| 2006/0114879 A1* | 6/2006 | Welborn et al. | 370/347 |
| 2006/0245384 A1* | 11/2006 | Talukdar et al. | 370/310 |
| 2007/0104174 A1 | 5/2007 | Nystrom et al. | |

FOREIGN PATENT DOCUMENTS

| | | |
|---|---|---|
| JP | 2002-540690 | 11/2002 |
| JP | 2005-117579 | 4/2005 |
| WO | WO-00/22866 | 4/2000 |
| WO | WO-00-57660 | 9/2000 |
| WO | WO-03-065755 | 8/2003 |

OTHER PUBLICATIONS

Jalali, A. et al., "Data Throughput of CDMA-HDR a High Efficiency-High Data Rate Personal Communication Wireless System", VTC2000 Spring, May 2000.

Chinese Office Action dated Dec. 31, 2011 for corresponding Chinese Application No. 200580050997.0 with English-language Translation.

Extended European Search Report dated Oct. 21, 2011 for corresponding European Application No. 05765558.1.

USPTO, (TAHA) Corrected Notice of Allowability, Jun. 27, 2013, in U.S. Appl. No. 12/000,782 [allowed].

USPTO, (TAHA) Notice of Allowance and Notice of Allowability, May 15, 2013, in U.S. Appl. No. 12/000,782 [allowed].

USPTO, (TAHA) Non-Final Rejection, Sep. 12, 2012, in U.S. Appl. No. 12/000,782 [allowed].

USPTO, (TAHA) Final Rejection, Aug. 19, 2011, in U.S. Appl. No. 12/000,782 [allowed].

USPTO, (TAHA) Non-Final Rejection, Jan. 6, 2011, in U.S. Appl. No. 12/000,782 [allowed].

* cited by examiner

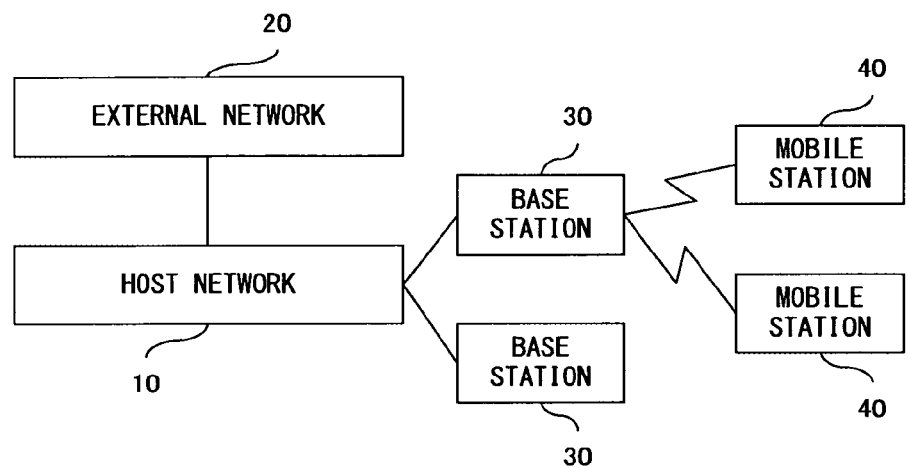
F I G. 1

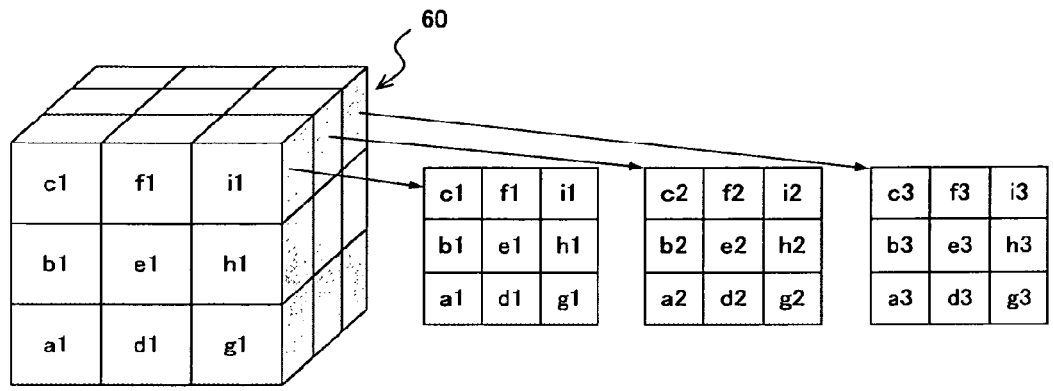
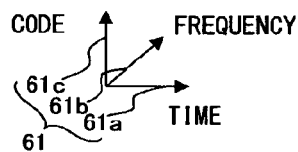
ALLOCATION PATTERN DEFINITION
| (51) PATTERN IDENTIFICATION NUMBER | (52) PATTERN HEAD COORDINATE | (53) ALLOCATION PATTERN |
|---|---|---|
| 1 | a1 | a1 |
| 2 | a1 | a1 b1 |
| 3 | a1 | a1 d1 |
| 4 | a1 | a1 a2 |
| 5 | a1 | a1 b1 c1 |
| 6 | a1 | a1 b1 d1 |
| 7 | a1 | a1 b1 a2 |
| 8 | a1 | a1 b1 b2 |
| 9 | a1 | a1 d1 e1 |
| 10 | a1 | a1 d1 a2 |
| | | |
|---|---|---|
| 11 | a1 | a1 d1 d2 |
| 12 | a1 | a1 a2 b2 |
| 13 | a1 | a1 a2 d2 |
| 14 | b1 | b1 d1 e1 |
| 15 | b1 | b1 a2 b2 |
| 16 | d1 | d1 a2 d2 |
F I G . 1 9

RADIO RESOURCE ALLOCATION METHOD AND TELECOMMUNICATION APPARATUS

CROSS-REFERENCE TO RELATED APPLICATIONS

This application is a continuation of application Ser. No. 12/000,782, filed Dec. 17, 2007, which is based upon and claims the benefit of priority of the prior continuation international PCT application No. PCT/JP2005/012643 filed on Jul. 8, 2005, the entire disclosures of which are hereby incorporated by reference.

BACKGROUND OF THE INVENTION

1. Field of the Invention

The present invention relates to a radio resource allocation technique and a radio telecommunication technique and in particular to a technique effectively applicable to a radio telecommunication system performing radio telecommunications by reserving and using a set of plurality kinds of radio resources.

2. Description of the Related Art

Internet connections using mobile terminals have become popular and higher speed telecommunications are in demand. A mobile terminal connects itself to a base station by utilizing a radio resource, and the base station connects itself to another base station or to an external network such as the Internet so that a path is eventually established to a telecommunication correspondent. In order to enable a plurality of mobile terminals to connect to one base station by virtue of there being a limited number of radio resources, multiple access systems are used such as Time Division Multiple Access (TDMA), Frequency Division Multiple Access (FDMA), and Code Division Multiple Access (CDMA).

The TDMA allocates a short divided time slot to a user in the same frequency band, thereby multiplexing the users. The FDMA divides a frequency band into small sections and assigns a frequency band to each user. The CDMA allocates an orthogonal code to each user at the same time in the same frequency band, thereby multiplexing the users. Since the resources usable at a base station are limited, it cannot be fixed for a mobile terminal. Therefore, the method used is to allocate a spare resource to a mobile terminal at the time at which a telecommunication is carried out. This requires a control for allocating and disconnecting a resource effectively.

Effective allocation and disconnection of a radio resource is carried out by a scheduling process that is defined as determining the priority order of a process such as allocating a packet to a user of a channel with a high reception quality at a higher priority, for example.

Known representative scheduling methods include the Maximum Carrier-to-Interference power Ratio (Max CIR) method and the Proportional Fairness (PF) method, both of which are disclosed in reference non-patent document 1, for example.

Further, a transmission method suitable to a high speed telecommunication includes a multi-carrier transmission converting transmission information parallelly into plural pieces of data and parallelly transmitting the data by modulating the parallel pieces of data respectively for plural carriers of different frequencies within a transmission band. The multi-carrier transmission transmits data parallelly, enabling a high speed transmission. In this case, the symbol length of the multi-carrier modulation is longer than the original symbol length by an amount equivalent to the parallelization and therefore it is possible to reduce the influence of a multi-pass that is due to a delay of a reflection wave in a radio telecommunication. Also, it becomes robust against frequency selective fading because the band width per carrier is narrower in the frequency range. An example of one such multi-carrier transmission system is Orthogonal Frequency Division Multiplexing (OFDM) using orthogonal carriers. A parallel use of the OFDM system with TDMA or CDMA makes it possible to perform user multiplexing in a time zone or code zone in addition to carrying out a parallel transmission in the frequency direction and to use a radio resource effectively.

In the case of an access method for reserving a resource prior to carrying out a telecommunication, receiving the reservation result, and starting a transmission of data in a radio telecommunication, if there are a plurality of resources allowing a reservation, the amount of control information for notifying the allocated resource is increased.

As an example, in the case of a system in which a mobile terminal sends a resource reservation signal to a base station in an uplink transmission, then allocates a resource and notifies the mobile terminal of the result of allocation in a downlink channel, it is also possible to transmit data in a downlink direction and to control information containing the allocation result in the same channel for an effective utilization of the resource. Such a case results in the control information and downlink data sharing a predetermined amount of resources and the volume of downlink data allowed to be transmitted together being reduced if the amount of control information is large, thus generating the problem of decreasing the downlink throughput.

Reference patent document 1 has put forth a system performing a scheduling by using a three-dimensional resource comprising frequency, time, and code in which a head slot and allocated spatial range information are reported as notification information. The spatial information indicates a rectangular solid enclosed by the unit frequency band, unit time slot and unit code, a combination of a plurality of which is allocated when allocating using a form other than the rectangular solid. The amount of notification information proportionately increases with the number of solids and therefore, if the form of the spatial range information becomes complex, a large number of resources for carrying the control information are consumed, thus ushering in the problem of a decrease in downlink throughput. A decreased amount of transmitted information accompanies a decreased throughput, bringing about the risk of a delayed transmission of the information and the possibility of not satisfying a permissible delay in a real-time service; real-time service requires a strict requirement with regard to a delay, such as in the situation of a voice telecommunication (e.g., Voice over Internet Protocol (VoIP)) using a packet(s), a service that is predicted to be popular in the future.

Non-patent document 1: A. Jalali, R. Padovani, R. Pankaj, "Data Throughput of CDMA-HDR a High Efficiency-High Data Rate Personal Communication Wireless System", VTC2000 Spring, May 2000

Patent document 1: Laid-Open Japanese Patent Application Publication No. 2005-117579

SUMMARY OF THE INVENTION

A purpose of the present invention is to provide a technique enabling a reduction in the amount of information required for reporting a result of allocating a radio resource in a radio telecommunication that is carrying out the information telecommunication by reserving and allocating the radio resource.

Another purpose of the present invention is to provide a technique enabling the prevention of a transmission delay of telecommunication information attributable to an increased amount of information required for reporting a result of allocating a radio resource in a radio telecommunication that is carrying out the information telecommunication by reserving and allocating the radio resource.

A first aspect of the present invention is to provide a radio resource allocation method for use in a radio telecommunication system for a first radio telecommunication apparatus and a second telecommunication apparatus carrying out a radio telecommunication by using an allocated radio resource, comprising selecting a resource allocation pattern identifying a combination of radio resources allocatable within a resource management space from among a pre-prepared plurality of resource allocation patterns, and notifying the second radio telecommunication apparatus of pattern identifier information identifying the selected resource allocation pattern and of startup position information thereof within the resource management space.

A second aspect of the present invention is to provide the radio resource allocation method noted in the first aspect, comprising the steps of preparing a plurality of resource allocation patterns specifying different combinations of the radio resources within a resource management space in which the radio resources are managed, selecting the resource allocation pattern applicable to a combination of the radio resources utilizable within the resource management space from among a plurality of the resource allocation patterns, and notifying the second radio telecommunication apparatus of pattern identifier information identifying the selected resource allocation pattern and of startup position information thereof within the resource management space.

A third aspect of the present invention is to provide the radio resource allocation method noted in the first aspect, wherein the second radio telecommunication apparatus carries out the steps of preparing a plurality of the resource allocation patterns, selecting the radio resource to be used on the basis of notified said pattern identifier information and notified said startup position information, and carrying out a radio telecommunication with the first radio telecommunication apparatus by using the selected radio resource.

A fourth aspect of the present invention is to provide the radio resource allocation method noted in the first aspect, wherein the radio resource is constituted by one or a combination of two or more, of frequency, code, and time.

A fifth aspect of the present invention is to provide the radio resource allocation method noted in the first aspect, preparing a plurality of the resource allocation patterns corresponding to combinations of only adjacent resources in any of the directions of frequency axis, time axis or code axis, within the resource management space when two or more of the elements comprising, frequency, code, and time, are used as the radio resource.

A sixth aspect of the present invention is to provide the radio resource allocation method noted in the first aspect, selecting the resource allocation pattern in which the transmission completion clock time predicted from the combination of radio resources is the earliest when the resource allocation pattern is selected.

A seventh aspect of the present invention is to provide the radio resource allocation method noted in the first aspect, selecting a resource allocation pattern in which the transmission completion clock time predicted from the combination of radio resources does not exceed a permissible delay required by the second radio telecommunication apparatus when the resource allocation pattern is selected.

An eighth aspect of the present invention is to provide a telecommunication apparatus, comprising: a storage unit for retaining a plurality of resource allocation patterns specifying different combinations of radio resources within a resource management space in which the radio resources are managed; a request information detection unit for detecting allocation request information of the radio resource; a resource pattern search allocation unit for searching for the resource allocation pattern corresponding to a combination of the allocatable radio resources in accordance with the allocation request information; and an allocation information notification unit for reporting pattern identifier information identicating the selected resource allocation pattern and reporting a startup position information thereof within the resource management space.

A ninth aspect of the present invention is to provide the telecommunication apparatus noted in the eighth aspect, wherein the radio resource is constituted by one, or a combination of two or more, of frequency, code, and time.

A tenth aspect of the present invention is to provide the telecommunication apparatus noted in the eighth aspect, wherein a plurality of the resource allocation patterns corresponding to combinations of only adjacent resources in any of the directions of frequency axis, time axis or code axis, within the resource management space are set in the storage unit two or more of the element comprising frequency, code, and time, are used as the radio resource.

An eleventh aspect of the present invention is to provide the telecommunication apparatus noted in the eighth aspect, wherein the resource pattern search allocation unit selects the resource allocation pattern in which a transmission completion clock time predicted from the combination of radio resources is the earliest.

A twelfth aspect of the present invention is to provide the telecommunication apparatus noted in the eighth aspect, wherein the resource pattern search allocation unit selects a resource allocation pattern in which a transmission completion clock time predicted from the combination of radio resources does not exceed a required permissible delay.

A thirteenth aspect of the present invention is to provide a telecommunication apparatus, comprising: a storage unit retaining a plurality of resource allocation patterns; a request information notification unit for reporting allocation request information of a radio resource; an allocation information detection unit for detecting pattern identifier information for identifying the notified resource allocation pattern and detecting startup position information of the resource allocation pattern; an allocation resource judgment unit for determining a usage radio resource on the basis of the resource allocation pattern obtained from the storage unit on the basis of the pattern identifier information and the startup position information; and a transmission unit for carrying out information telecommunication by using the usage radio resource.

A fourteenth aspect of the present invention is to provide the telecommunication apparatus noted in the thirteenth aspect, wherein the request information notification unit sets, in the allocation request information, at least one of a permissible delay time, transmission speed, and telecommunication line condition information.

The present invention noted above brings forth the effects or benefits described in paragraphs (i) through (vi) following:

(i) A flexible resource allocation in accordance with the number of patterns is enabled by pre-determining a pattern of radio resources to be allocated, and a notification of the allocated radio resource information requires only a minimum amount of information, thereby enabling a reduction in control information and an effective utilization of a radio resource.

(ii) The notification of information related to a permissible delay together with a request for a radio resource makes it possible to allocate the radio resource by considering a delay, satisfying the permissible delay.

(iii) The definition of an allocation pattern by using one or plural items of the elements comprising the three-dimensional resource, i.e., frequency, time, and code, as a radio resource makes it possible to carry out a flexible resource allocation and also to reduce the amount of control information required for reporting the allocated resource, thus enabling an effective utilization of the radio resources.

(iv) The definition of only an allocation pattern using only the adjacent blocks in the kind of resource of any of the directions of frequency, time, or code when using plural items of the elements comprising the three-dimensional resource, i.e., the frequency, time, and code makes it possible to reduce the number of patterns of allocated resources and the amount of control information.

(v) The selection of a pattern of which the transmission completion clock time is the earliest when selecting a resource allocation pattern shortens the delay.

(vi) The selection of a pattern of which the transmission completion clock time does not exceed a permissible delay when selecting a resource allocation pattern makes it possible to satisfy the permissible delay.

BRIEF DESCRIPTION OF THE DRAWINGS

FIG. 1 is a conceptual diagram exemplifying a configuration of a radio telecommunication system comprising a radio telecom apparatus according to a preferred embodiment of the present invention;

FIG. 19 is a conceptual diagram of an allocation pattern definition table in the case of specifying only adjacent resources in any of the directions of frequency, time or code;

DESCRIPTION OF THE PREFERRED EMBODIMENTS

The following is a detailed description of the preferred embodiment of the present invention by referring to the accompanying drawings.

Figure 2:
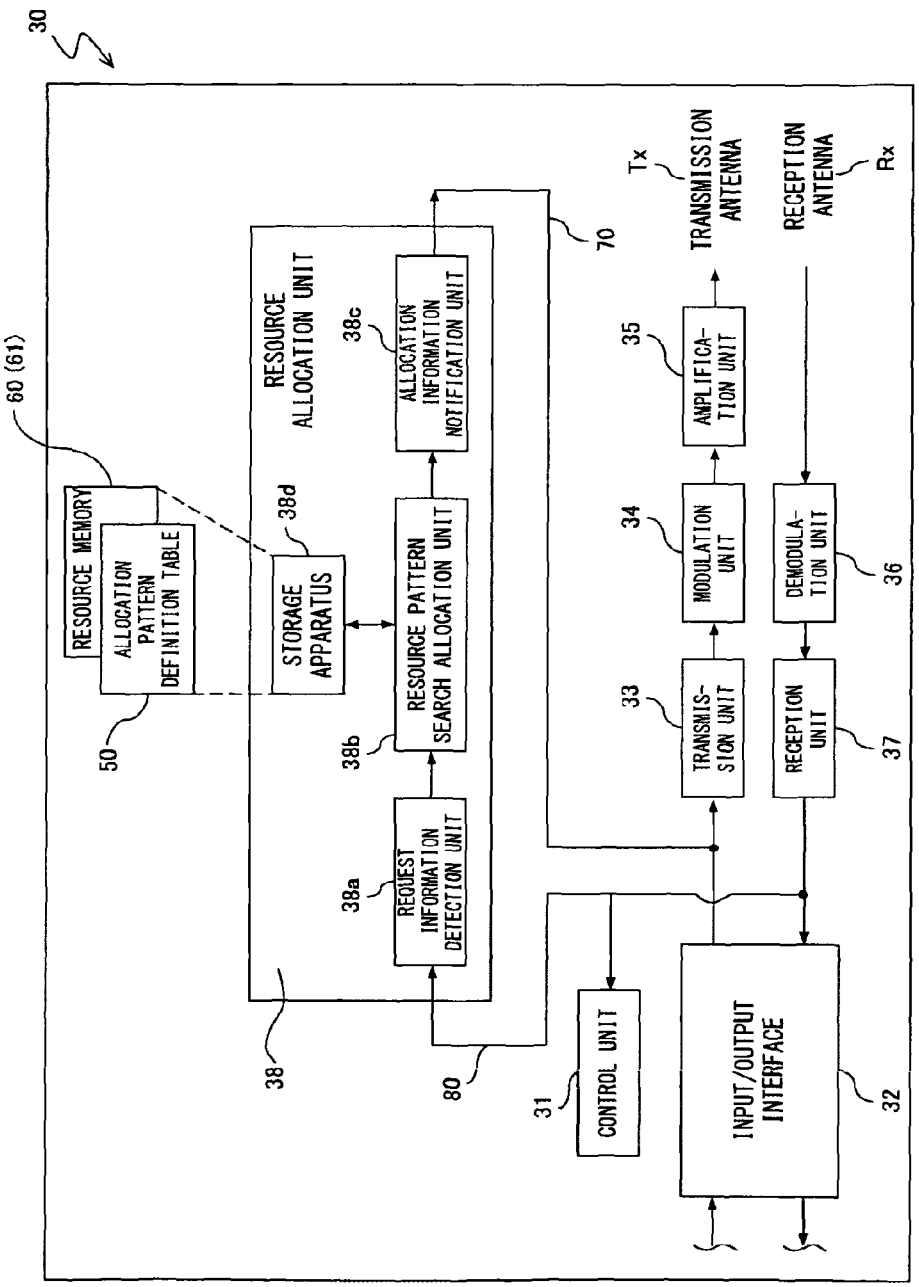
FIG. 2 is a block diagram exemplifying a configuration of a radio telecommunication apparatus constituting a base station according to a preferred embodiment of the present invention.
Figure 3:
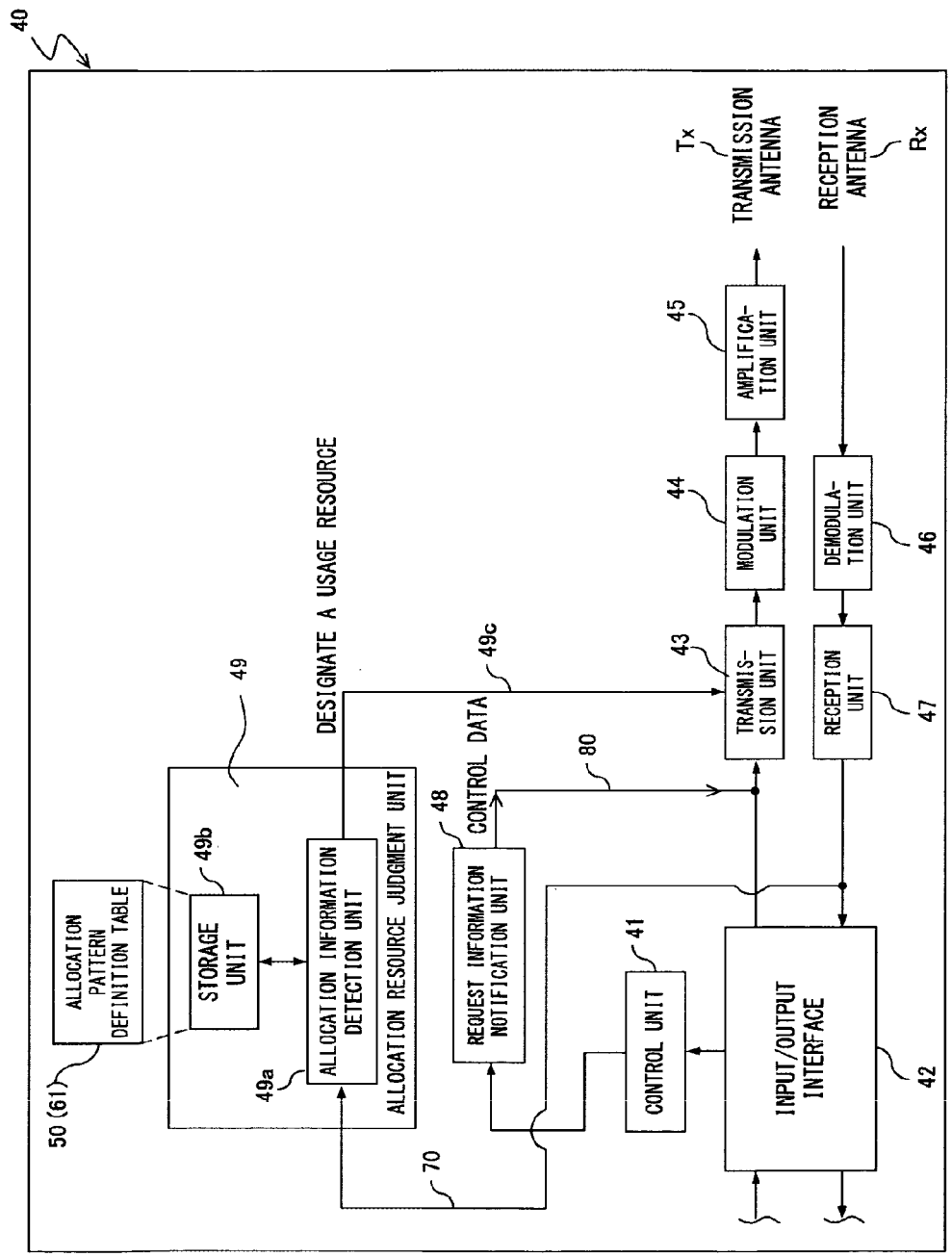
FIG. 3 is a block diagram exemplifying a configuration of a radio telecommunication apparatus constituting a mobile station according to a preferred embodiment of the present invention.
Figure 4:
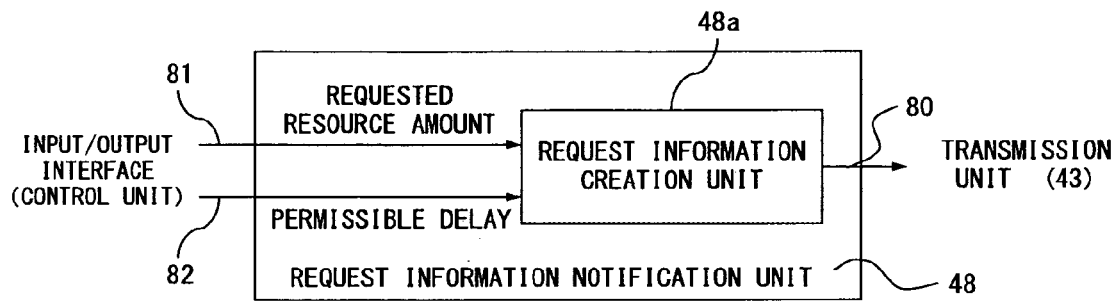
FIG. 4 is a block diagram exemplifying, in greater detail, a configuration of a part of a radio telecommunication apparatus constituting a mobile station according to a preferred embodiment of the present invention.

FIG. 1 is a conceptual diagram exemplifying a configuration of a radio telecommunication system comprising a radio telecommunication apparatus according to a preferred embodiment of the present invention; FIG. 2 is a block diagram exemplifying a configuration of a radio telecommunication apparatus constituting a base station according to the present embodiment; FIG. 3 is a block diagram exemplifying a configuration of a radio telecommunication apparatus constituting a mobile station according to the present embodiment; and FIG. 4 is a block diagram exemplifying, in greater detail, a configuration of a part of a radio telecommunication apparatus constituting a mobile station according to the present embodiment.

The radio telecom system according to the present embodiment comprises a plurality of base stations 30 and a plurality of mobile stations 40 for carrying out radio telecommunications between themselves and the respective base stations 30. The plurality of base stations 30 are connected to a host network 10, through which information telecommunication between the individual base stations 30 (i.e., the plurality of mobile stations 40 subordinate to the plurality of base stations 30) are carried out.

The host network 10 is connected to an external network 20, such as a public telecommunication network for example, and the individual mobile station 40 is enabled for information telecommunication with the external network 20.

As exemplified in FIG. 2, the base station 30 according to the present embodiment comprises a control unit 31, an input/output interface 32, a transmission unit 33, a modulation unit 34, an amplification unit 35, a demodulation unit 36, a reception unit 37, a transmission antenna Tx, a reception antenna Rx and a resource allocation unit 38.

In a reception process, a reception signal received at the reception antenna Rx is decoded at the demodulation unit 36 and is then handed to the reception unit 37. The reception unit 37 then applies a decoding process to the reception signal and divides it into control data and information data, and the control data is then handed to the control unit 31 and the information data is output to the host network 10 by way of the input/output interface 32.

In a transmission process, information desired to be transmitted is input by way of the input/output interface 32 and is handed to the transmission unit 33. The transmission unit 33 performs the generation of control data, coding, interleaving and the generation of control timing. The output of the transmission unit 33 is modulated by the modulation unit 34 and transmitted from the transmission antenna Tx by way of the amplification unit 35. Note that the modulation method is arbitrary. Also, the amplification unit 35 is optional. Further, the control unit 31 controls the entirety of the base station 30.

The resource allocation unit 38 comprises a request information detection unit 38a, a resource pattern search allocation unit 38b, an allocation information notification unit 38c, and a storage apparatus 38d.

The storage apparatus 38d stores an allocation pattern definition table 50 and resource memory 60, which are described later.

Figure 5:
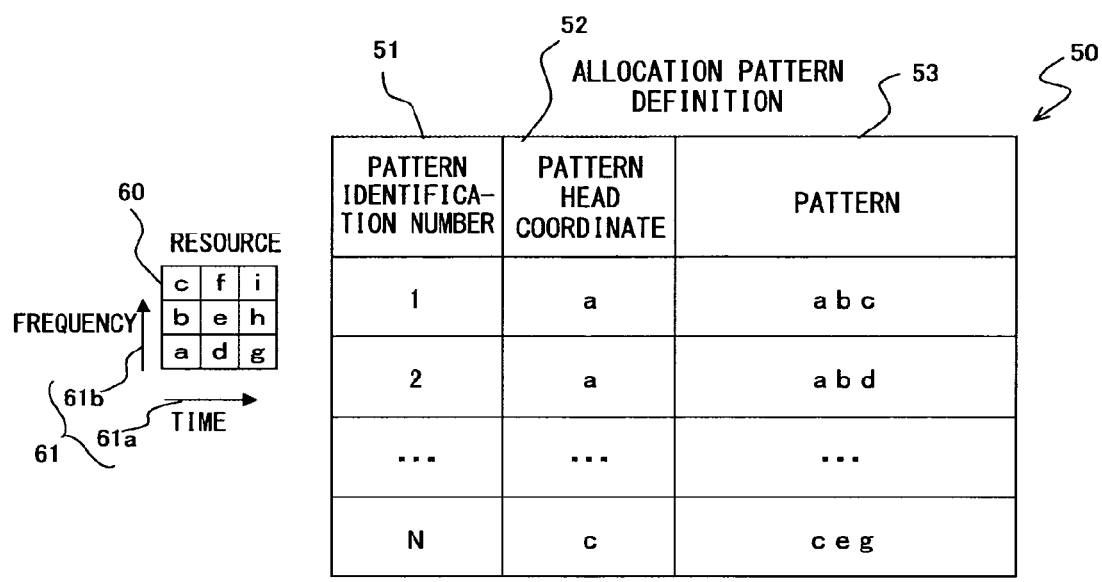
FIG. 5 is a conceptual diagram exemplifying an allocation pattern definition for a two-dimensional resource.

FIG. 5 is a conceptual diagram exemplifying a configuration of the allocation pattern definition table 50 and resource memory 60.

The resource memory 60 defines a plurality of resources 60a constituted by, for example, combinations of time (i.e., a time slot) and frequency (i.e., a frequency band).

That is, the resource 60a is managed by the resource space 61 constituted by the first coordinate axis 61a in the direction of time and by the second coordinate axis 61b in the direction of frequency within the resource memory 60. The "a" through "i" within the resource memory 60 indicates the position of the individual resource 60a within the resource space 61. The individual resource 60a is managed as to whether or not it is already allocated by a bit map in which spare zones, that is, zones that are utilizable, change to "worm holes" as allocations of resources progress.

Figure 6:
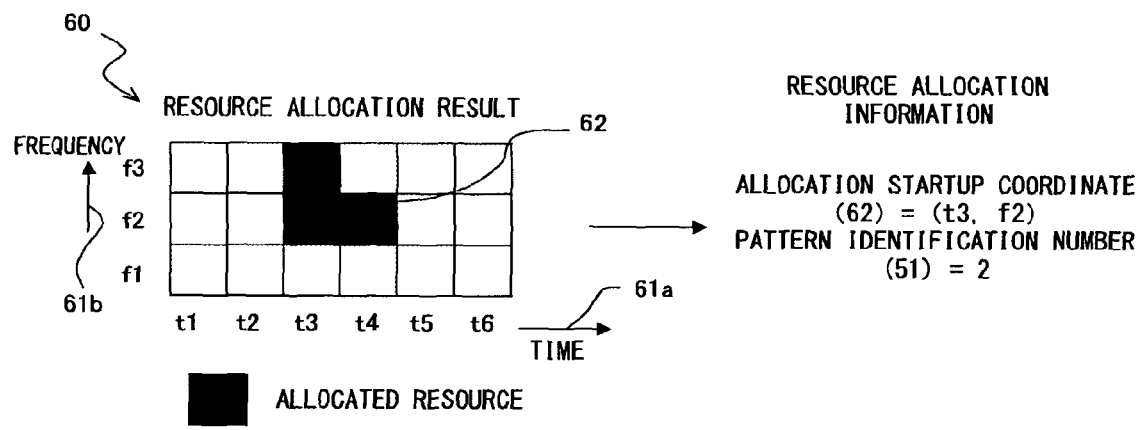
FIG. 6 is a description diagram exemplifying a resource allocation result, and resource allocation information, for a two-dimensional resource.

FIG. 6 exemplifies an allocation of resources 60a in the resource memory 60. The example of FIG. 6 indicates the case of a set of three resources 60a, i.e., (t3, f2), (t3, f3) and (t4, f2). The positional relationship of the three resources 60a constitutes the positional relationship of (a, b, d) in the resource space 61. The present embodiment is configured to store a relative positional relationship of a plurality of resources within such a resource space 61 as a resource allocation pattern 53 in the allocation pattern definition table 50. The individual resource allocation pattern 53 is identified by a pattern identification number 51.

That is, the allocation pattern definition table 50 stores a pattern identification number 51 and a pattern head coordinate 52, both of which are respectively correlated with a pre-prepared plurality of resource allocation patterns 53. The pattern head coordinate 52 is definition information indicating a pattern head position corresponding to an allocation startup coordinate 62 within the resource space 61 when searching within the resource space 61 by using the resource allocation pattern 53. In the example of FIG. 6, the allocation startup coordinate 62 is the position of (t3, f2) corresponding to the "a" of the pattern head coordinate 52 of the resource allocation patterns 53 of (a, b, d).

It is therefore possible to identify the relative positional relationship of a plurality of resources within the resource space 61 by virtue of the resource allocation pattern 53 and to identify the absolute position of one set of resources having the positional relationship within the resource space 61 by using the allocation startup coordinate 62.

Figure 7:
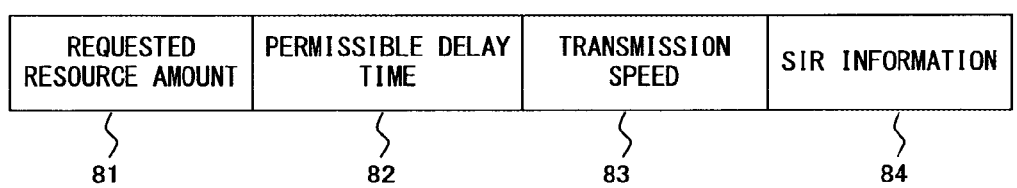
FIG. 7 is a conceptual diagram exemplifying a structure of allocation request information used in a resource allocation method according to a preferred embodiment of the present invention.

Then, a resource pattern search allocation unit 38b searches for a resource allocation pattern 53 applicable to the combination of resources 60a satisfying the allocation request information 80 of a structure as exemplified in FIG. 7. It further searches for, within the resource space 61, spare resources 60a of which the array state matches with the resource allocation pattern 53, detects an allocation startup coordinate 62 corresponding to the start position of the array (i.e., the pattern head coordinate 52) within the resource space 61, and notifies the mobile station 40 of the detection result as control data by way of the transmission unit 33.

Figure 8:
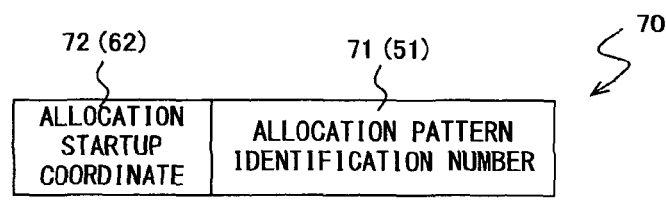
FIG. 8 is a conceptual diagram exemplifying a format of allocation notification information.

FIG. 8 shows an example of a format of control data (i.e., allocation notification information 70) for a base station 30 notifying a mobile station 40 of a result of allocating the resource 60a. The allocation notification information 70 comprises an allocation pattern identification number 71 and an allocation startup coordinate 72.

The allocation pattern identification number 71 is set with a pattern identification number 51 corresponding to the resource allocation pattern 53 of the search result described above. The allocation startup coordinate 72 is set with an allocation startup coordinate 62 corresponding to the pattern head coordinate 52 of the present resource allocation pattern 53 within the resource space 61.

That is, the request information detection unit 38a detects the allocation request information 80 related to an allocation of resources as exemplified in FIG. 7 as described above from the information received at the reception unit 37. The allocation request information 80 is enabled to comprise at least any one of the items of information, which includes a requested resource amount 81, a permissible delay time 82, a transmission speed 83, or Signal to Interference Ratio (SIR) information 84.

Then, the resource pattern search allocation unit 38b searches for a resource allocation pattern 53 satisfying the allocation request information 80 from among the resource allocation patterns 53 pre-defined in the allocation pattern definition table 50 that is stored in a storage apparatus 38d, judges whether or not it is possible to perform allocation, and selects one of the allocatable resource allocation patterns 53. Finally, the allocation information notification unit 38c sets an allocation pattern identification number 71 (i.e., a pattern identification number 51), which indicates the selected resource allocation pattern 53, and the allocation startup coordinate 72 (i.e., the allocation startup coordinate 62 in the resource space 61) in the allocation notification information 70, transmits the setup result to the transmission unit 33, and responds to the mobile station 40 by way of the modulation unit 34, amplification unit 35, and transmission antenna Tx.

As exemplified in FIG. 3, the mobile station 40 according to the present embodiment comprises a control unit 41, an input/output interface 42, a transmission unit 43, a modulation unit 44, an amplification unit 45, a demodulation unit 46, a reception unit 47, a request information notification unit 48, and an allocation resource judgment unit 49.

In a reception process, a reception signal coming into the reception antenna Rx is decoded by the demodulation unit 46 and handed over to the reception unit 47. The reception unit 47 applies a decoding process for dividing control data from information data. The control data is handed over to the control unit 41, while the information data is output to an information processing unit provided in the mobile station 40 and to a user interface of voice, video, et cetera, by way of the input/output interface 42.

In a transmission process, information desired to be transmitted is input from the information processing unit provided in the mobile station 40 and into a user interface of voice, video, etcetera, byway of the input/output interface 42, and handed over to the transmission unit 43. The transmission unit 43 carries out the generation of control data, a coding, an interleaving and the generation of a control timing. The output of the transmission unit 43 is modulated by the modulation unit 44 and transmitted from the transmission antenna Tx by way of the amplification unit 45. Note that the modulation method is discretionary. Also, the amplification unit 45 is optional. Further, the control unit 41 controls the entirety of the mobile station 40.

The allocation resource judgment unit 49 according to the present embodiment comprises an allocation information detection unit 49a and a storage unit 49b. The storage unit 49b stores the allocation pattern definition table 50 on the base station 30 side as described above, the allocation pattern definition table 50 which are common to resource space 61, and the definition information of resource space 61.

The allocation information detection unit 4 9a comprises the function of detecting a resource allocation pattern 53 corresponding to the allocation pattern identification number 71 and an allocation startup coordinate 62 of the resource space 61 corresponding to the allocation startup coordinate 72 from the allocation notification information 70 reported from the base station 30, and the function of determining a radio resource 49c to be used at the transmission unit 43 from the information of the detected resource allocation pattern 53 and allocation startup coordinate 62 by using the method shown in FIG. 6 described above and setting the radio resource 49c in the present transmission unit 43.

Meanwhile, the request information notification unit 48 comprises a request information creation unit 48a as exemplified in FIG. 4. The request information creation unit 48a comprises the function of generating allocation request information 80 from the information such as the requested resource amount 81, permissible delay time 82, transmission speed 83 and SIR information 84, which are input from the input/output interface 42 by way of the control unit 41, and transmitting the generated information 80 to the transmission unit 43.

When data to be transmitted from a mobile station 40 has been generated, the request information notification unit 48 first notifies, by way of the transmission unit 43, the base station 30 of allocation request information 80 (e.g., a requested resource amount 81 is included) that is necessary for transmitting information. If and when allocation notification information 70 that is a result of resource allocation is sent over from the base station 30, the information is received at the reception unit 47 and the allocation notification information 70 is sent to the allocation resource judgment unit 49.

The allocation resource judgment unit 49 has the allocation information detection unit 49a, which detects an allocation pattern identification number 71 which indicates the resource allocation pattern 53, and allocation startup coordinate 72 which indicates the allocation startup coordinate 62 of the resource space 61; determines a usable resource 60a allocated by the base station 30 by referring to the allocation pattern definition table 50 stored in the storage apparatus 49b; and transmits the determined resource 60a to the transmission unit 43. The transmission unit 43 transmits the information data by using the designated resource 60a. In this event, it is also possible to transmit, together with the information data, control data including the allocation request information 80 for reserving a resource 60a for transmitting the next set of information data.

Figure 9:
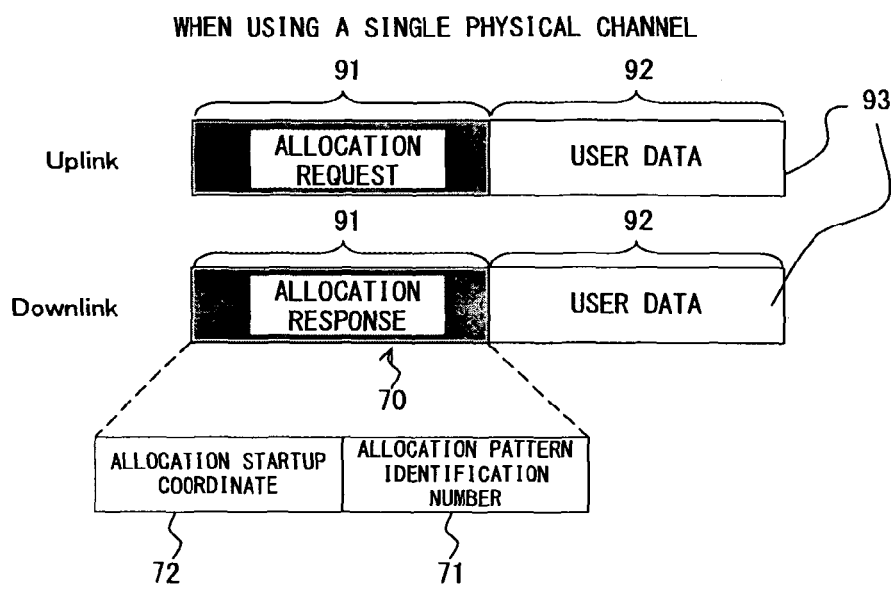
FIG. 9 is a conceptual diagram exemplifying a transmission method for allocation request information and allocation notification information according to a preferred embodiment of the present invention.
Figure 10:
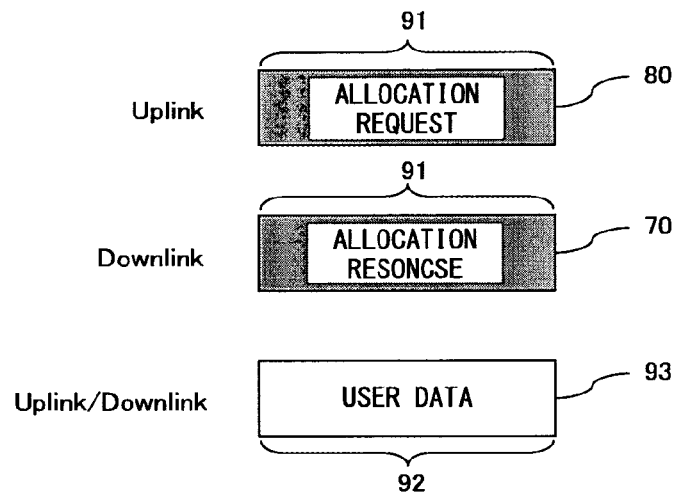
FIG. 10 is a conceptual diagram exemplifying a transmission method for allocation request information and allocation notification information according to a preferred embodiment of the present invention.

Note that a method for transmitting the allocation request information 80 from a mobile station 40 to a base station 30 and responding with the allocation notification information 70 from the base station 30 to mobile station 40 may be a method using a single physical channel between the base station 30 and mobile station 40 as exemplified in FIG. 9 or a method using separate physical channels as exemplified in FIG. 10.

In the method of FIG. 9 using a single physical channel, allocation request information 80 is set in control data 91, and it is transmitted from the mobile station 40 to base station 30 (i.e., an uplink) together with user data 93 that is information data 92.

Further, allocation notification information 70 corresponding to the allocation request information 80 is set in the control data 91 and it is transmitted from the base station 30 to mobile station 40 (i.e., a downlink) together with user data 93 that is information data 92.

Comparably, in the method of FIG. 10 using separate physical channels, the allocation request information 80 is transmitted from the mobile station 40 to base station 30 (i.e., an uplink) singularly as control data 91, and the responded allocation notification information 70 is transmitted from the base station 30 to mobile station 40 (i.e., a downlink) singularly as control data 91. User data 93 as information data 92 is transmitted and received between the base station 30 and mobile station 40 singularly (i.e., uplink and downlink).

The following is a description of an operation of the present embodiment.

A mobile station 40 reserves a radio resource with a base station 30 prior to a transmission of information. Having received a reservation signal from the mobile station 40, the base station 30 detects allocation request information 80 included in the reservation signal and secures a radio resource in accordance with the allocation request information 80 and a resource allocation method. The base station 30 notifies the mobile station 40 of the secured radio resource as allocation notification information 70, and the mobile station 40 transmits information by using the radio resource in accordance with the notified allocation notification information 70.

Figure 11:
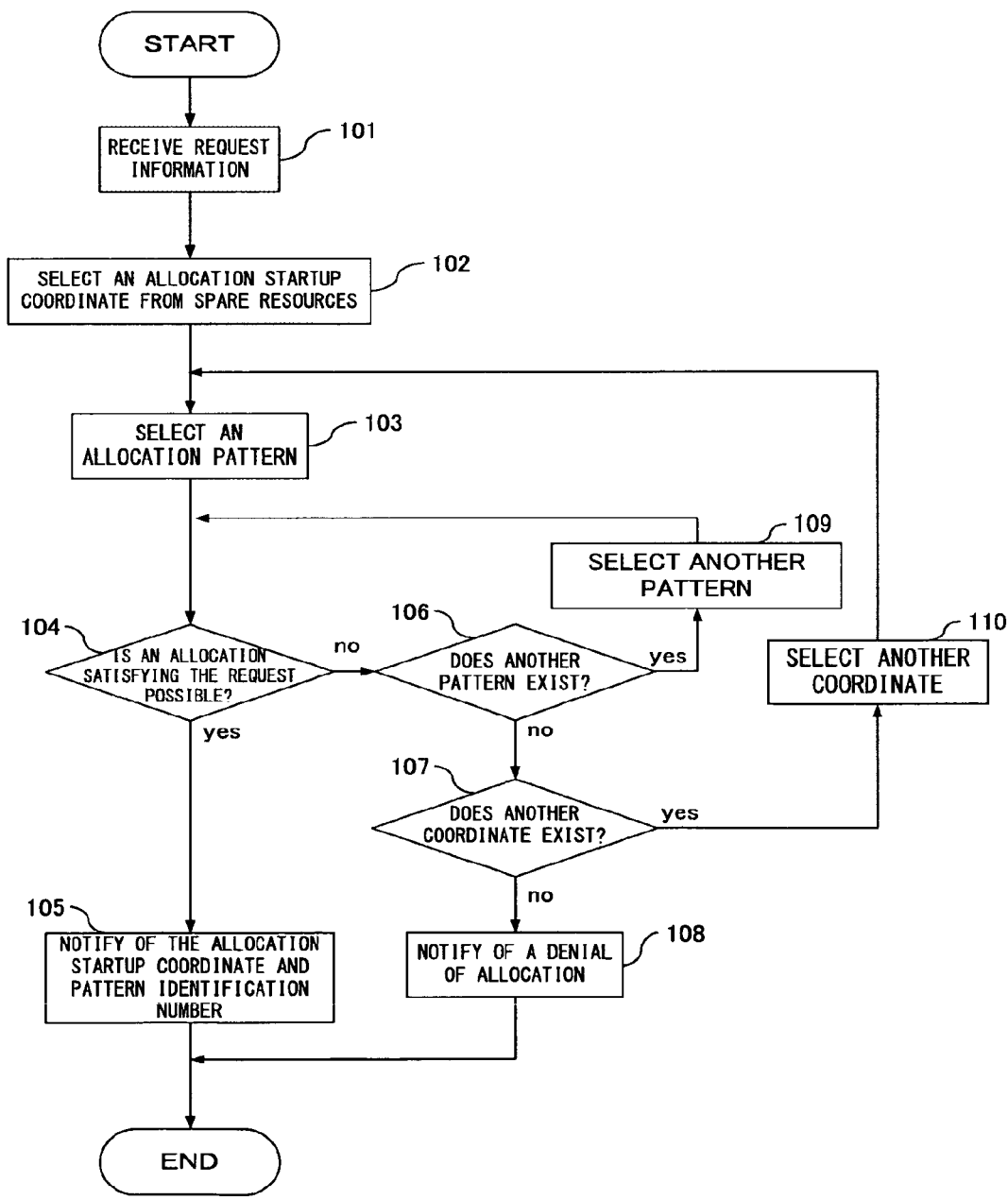
FIG. 11 is a flow chart exemplifying an allocation method for a resource at a base station.

FIG. 11 is a flow chart exemplifying an allocation method for a resource at the base station 30.

Having received the allocation request information 80 from the mobile station 40 (step 101), the base station 30 first refers to the resource memory 60 and selects a coordinate, within the resource space 61, for starting an allocation from spare resources (step 102).

Then, it selects one pattern from the resource allocation patterns 53 pre-defined within the allocation pattern definition table 50 (step 103), compares this pattern with the spare resources, and judges whether or not an allocation satisfying the request is possible (step 104).

If the result of a search finds an allocatable resource zone, as shown in FIG. 6 as an example, the base station 30 sets a pattern identification number 51 corresponding to the searched for resource allocation pattern 53 and sets an allocation startup coordinate 62 within the resource space 61; both are set in the allocation notification information 70 as the allocation pattern identification number 71 and allocation startup coordinate 72, respectively. The base station 30 then notifies the mobile station 40 of the allocation notification information 70 (step 105).

If the judgment of step 104 finds an unsatisfying allocation, it then judges whether or not another unprocessed resource allocation pattern 53 exists (step 106) and, if the other resource allocation pattern 53 exists, it selects the aforementioned other resource allocation pattern 53 (step 109), and then performs the processes in step 104 and thereafter.

Contrarily, if the judgment of step 106 finds no other resource allocation pattern 53, it then judges whether or not another allocation startup coordinate 62 exists (step 107) and, if another allocation startup coordinate 62 exists, it selects the other allocation startup coordinate 62 (step 110), and then repeats the processes of steps 103 and thereafter described above.

Contrarily, if the judgment of step 107 finds an exhaustion of allocation startup coordinate 62, the base station 30 determines that there is an incapability of allocation and accordingly notifies the mobile station 40 of a denial of allocation (step 108).

Incidentally, in step 108, the method according to the present embodiment using the resource allocation pattern 53 maybe changed to a method of discretely selecting an individual resource 60a, thereby notifying the mobile station 40 of a spare resource 60a in place of the denial of allocation, even if an information volume is increased from the allocation notification information 70.

Figure 12:
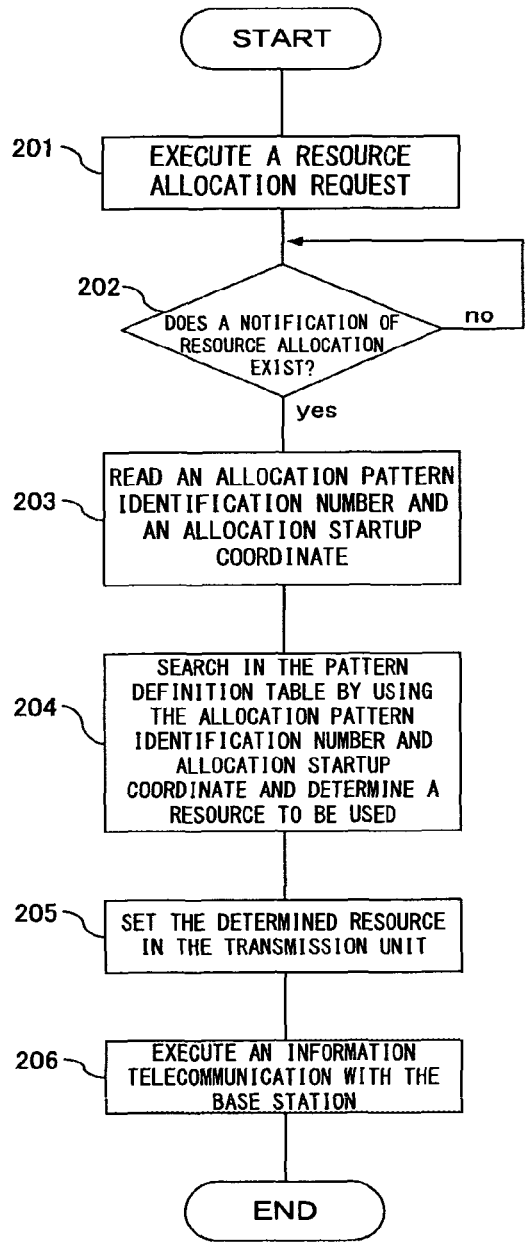
FIG. 12 is a flow chart exemplifying an operation of a mobile station in a resource allocation method according to a preferred embodiment of the present invention.

FIG. 12 is a flow chart exemplifying a method for determining a resource on a mobile station side.

The mobile station 40 first has the request information notification unit 48 generate allocation request information 80, transmits it to the base station 30 (step 201), and waits for a response of allocation notification information 70 from the base station 30 (step 202).

Having received the allocation notification information 70, the mobile station 40 reads the information of a pattern identification number 51, which is set in the allocation pattern identification number 71, from the allocation notification information 70 and also reads the information of an allocation startup coordinate 62 within the resource space 61, which is set in the allocation startup coordinate 72 (step 203). Then, it recognizes an applicable resource allocation pattern 53 by searching in the allocation pattern definition table 50 stored in the storage apparatus 49b by using the pattern identification number 51, combines it with the information of the allocation startup coordinate 62 in the resource space 61, and determines a resource to be used (step 204).

Then, it sets the information of the determined resource in the transmission unit 43 (step 205) and carries out an information telecommunication with the base station 30 (step 206).

Figure 13:
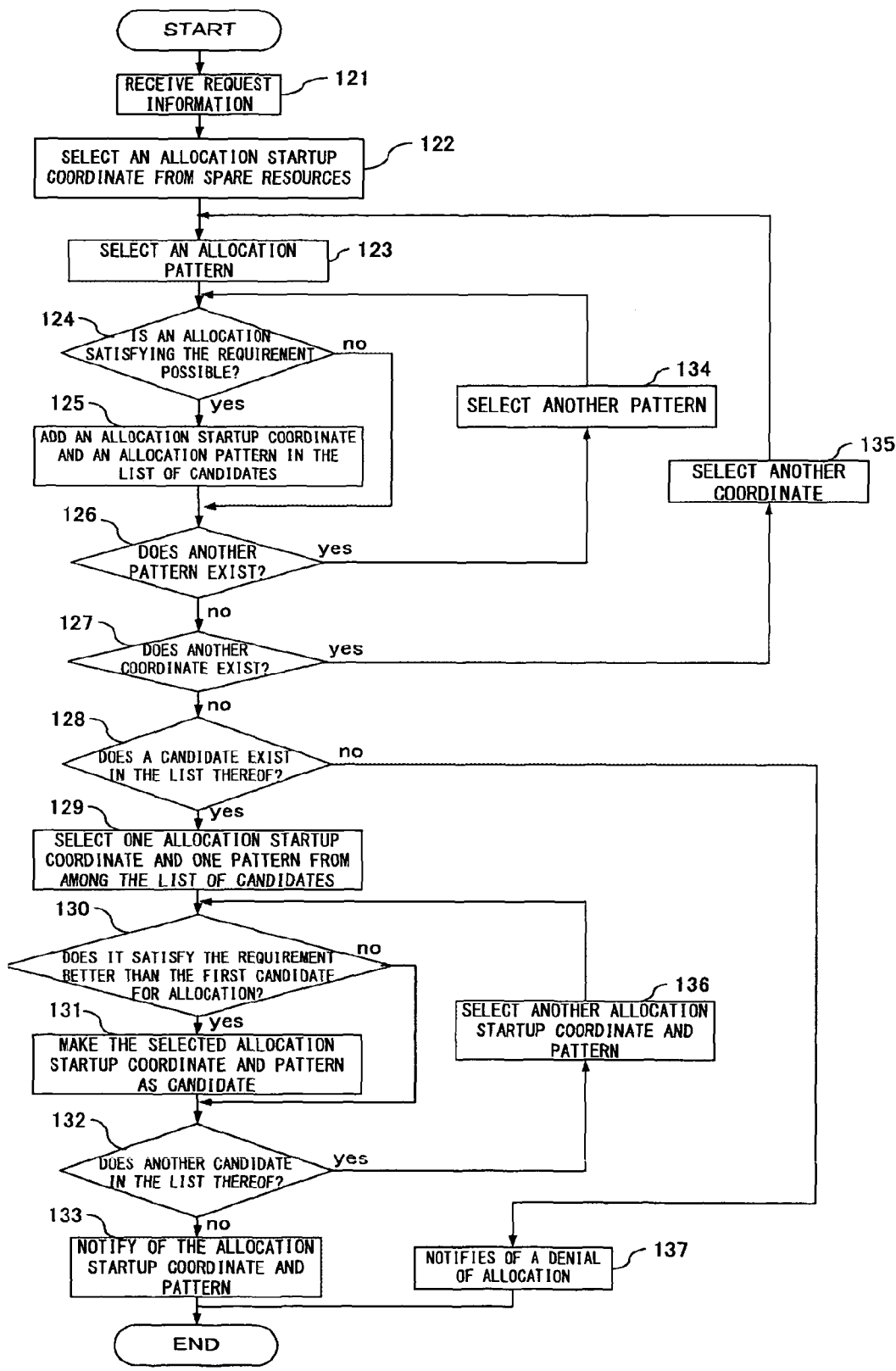
FIG. 13 is a flow chart showing a modified embodiment of a resource allocation method on a base station side.

FIG. 13 is a flow chart showing a modified embodiment of a resource allocation method in a base station 30. The example shown in FIG. 13 selects a plurality of resource allocation patterns 53 satisfying the allocation request information 80, determines the one resource allocation pattern 53 from among them that satisfies the allocation request information 80 the best, and notifies the mobile station 40 of the selection as allocation notification information 70.

Having received the allocation request information 80 from the mobile station 40 (step 121), the base station 30 selects a coordinate for starting an allocation from spare resources within the resource space 61 of the resource memory 60 (step 122). Then, it selects one pattern from among the resource allocation patterns 53 pre-defined in the allocation pattern definition table 50 (step 123), compares the selected pattern with the spare resources, judges whether or not an allocation satisfying the request is possible (step 124), and continues to search while selecting another resource allocation pattern 53 or allocation startup coordinate 62 (steps 134 and 135) until an allocatable resource allocation pattern 53 and the allocation startup coordinate 62 are found (steps 126 and 127).

In the process of the search, if the allocatable resource allocation pattern 53 and allocatioin startup coordinate 62 are found in above step 124, the base station 30 adds it to a list of candidates as a candidate for allocation (step 125).

Then, if the list of candidates is not empty (step 128), it selects the resource allocation pattern 53 that satisfies the request the best (steps 129, 130, 131, 132 and 136) from among the list of allocation candidates and reports the pattern identification number 51 and allocation startup coordinate 62 as notification information (step 133).

When allocating a resource of the time axis (i.e., the first coordinate axis 61a) as an example of an allocation request by the allocation request information 80, it is necessary to consider requirements related to delays. The more the allocated time resource (i.e., the time slot) is delayed, the greater the delay, and therefore the allocation of a resource at a point in time that is within a permissible delay time satisfies the requirement better. Therefore, in this case, steps 129 through 132 above select a candidate for allocation on the basis of the magnitude of the delay time of each candidate for allocation.

Meanwhile, when allocating a resource of the frequency axis (i.e., the second coordinate axis 61b) as an example of an allocation request, if a system divides a particularly wide frequency band before the allocation, a frequency selective fading is generated in an environment with a large number of multi-paths and the reception qualities are different among the divided frequency bands, and therefore the selection of a frequency band with a good propagation environment that is likely to satisfy the required reception quality better satisfies the requirement. In this case, steps 129 through 132 above accordingly select the individual candidate for allocation on the basis of a frequency band with a good propagation environment.

If the list of candidates is empty, the base station 30 notifies the mobile station 40 of a denial of allocation (step 137).

Figure 14:
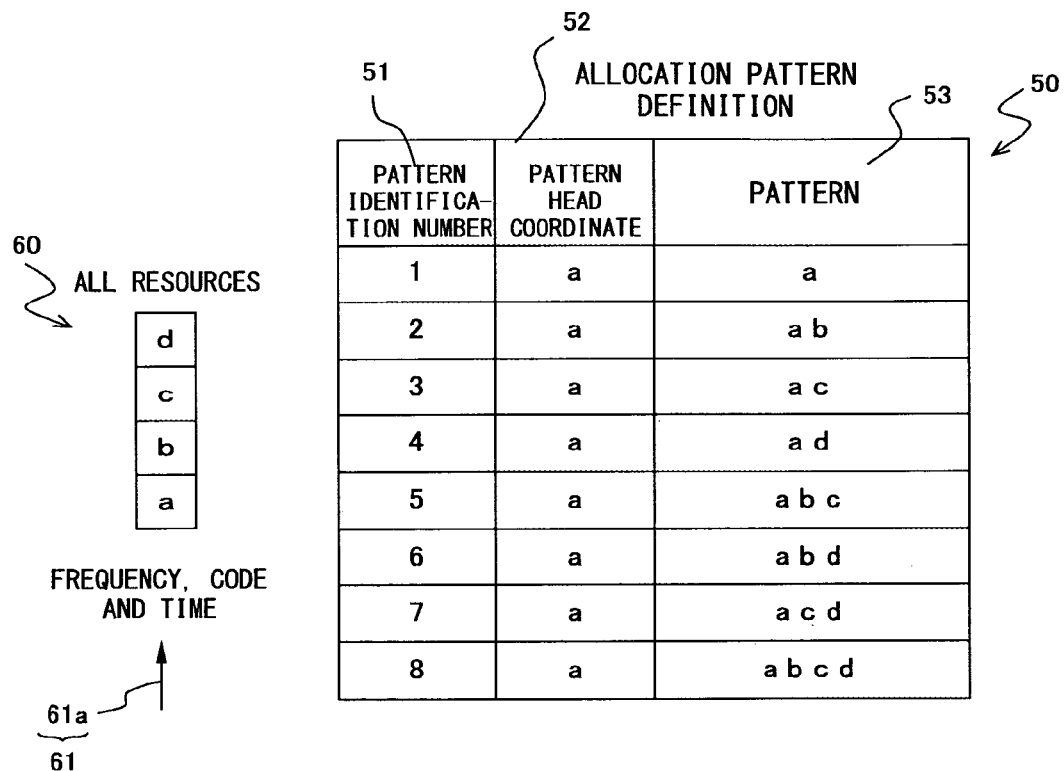
FIG. 14 is a conceptual diagram exemplifying a structure of an allocation pattern definition table and resource memory (i.e., a resource space) in the case of allocating any one of frequency, time, or code as resource.

Next, an allocation pattern definition table 50 and resource memory 60 (i.e., the resource space 61) when allocating any one of frequency, time, or code as a resource 60a are exemplified by referring to FIG. 14.

First, the case of dividing time into units of slot in the same frequency and allocating the number of time slots to a user in accordance with a requested resource amount is examined. In this case, the frequency is fixed and therefore a resource space 61 is a one-dimensional space with the first coordinate axis 61a being the time axis and the individual positions, i.e., a, b, c and d, indicating a row of different time slots. It is also possible for a resource space 61 to be expressed by a coordinate, the head slot determined, and other slots expressed by relative coordinates, for a resource allocation pattern 53.

Next, an example is shown of using frequency as a resource by referring also to FIG. 14. Here, the time is divided into units of slot, the frequency is divided into units of frequency band, and a zone enclosed by a specific units of time slot and units of frequency band is allocated to a user as a units of resource in accordance with a requested resource amount.

That is, the first coordinate axis 61*a* is the frequency axis and the individual positions, i.e., a, b, c and d, indicate a row of different units of frequency band in the resource space 61 in this case. Also possible is that a resource space 61 is expressed by a coordinate, the head slot is determined, and other slots are expressed by relative coordinates, for a resource allocation pattern.

When carrying out a radio telecommunication by using a frequency band in a wide band, a large number of delay waves are generated by reflection and/or diffraction in a mobile telecommunication environment, the influence of which generates a frequency selective fading under which the reception power and reception quality fluctuate for each narrow frequency band. Therefore, an allocation of a combination of frequency bands by determining a resource allocation pattern 53 that matches with a variation of reception power or reception quality in the frequency axis makes it possible to carry out a telecommunication with a better resource usage efficiency in a resource allocation method carrying out a resource allocation by dividing the frequency band.

Next an example of using a code as a resource is shown, also by referring to FIG. 14. In this case, the first coordinate axis 61*a* constitutes a code axis and a, b, c and d correspond to different units of code in the resource space 61 since the different units of code are allocated to a specific time slot. Because a small correlation between codes makes it easy to separate a desired radio wave from an interference wave, the selection of a resource allocation pattern 53 that results in a combination that minimizes the correlation between the codes enables an improvement of reception quality and the execution of a telecommunication with a good resource usage efficiency.

Figure 15:
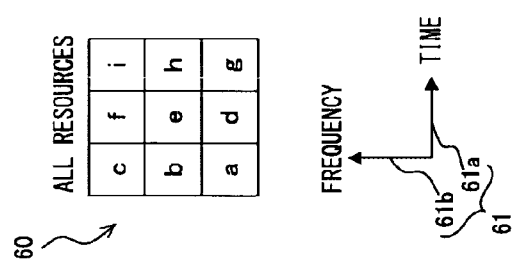
FIG. 15 is a conceptual diagram exemplifying a structure of an allocation pattern definition table and resource memory (i.e., a resource space) in the case of using frequency and time as resources.

Next, an example of using time and frequency as resources is shown more specifically. FIG. 15 exemplifies a correlation between the allocation definition table 50 and resource memory 60 in the resource space 61 in the case of using time and frequency as resources. In this case, time is divided into units of time slot, frequency is divided into units of frequency band (i.e., slots), and a frequency band is allocated to a user in accordance with the amount of a resource requested. In the resource space 61, the first coordinate axis 61*a* is the time axis, and the second coordinate axis 61*b* is the frequency axis. The "a" through "i" indicate the individual combinations of different time slots and frequency slots. It is also possible for a resource space 61 to be expressed by a coordinate, the head slot determined, and other slots expressed by relative coordinates, for a resource allocation pattern 53.

Figure 16:
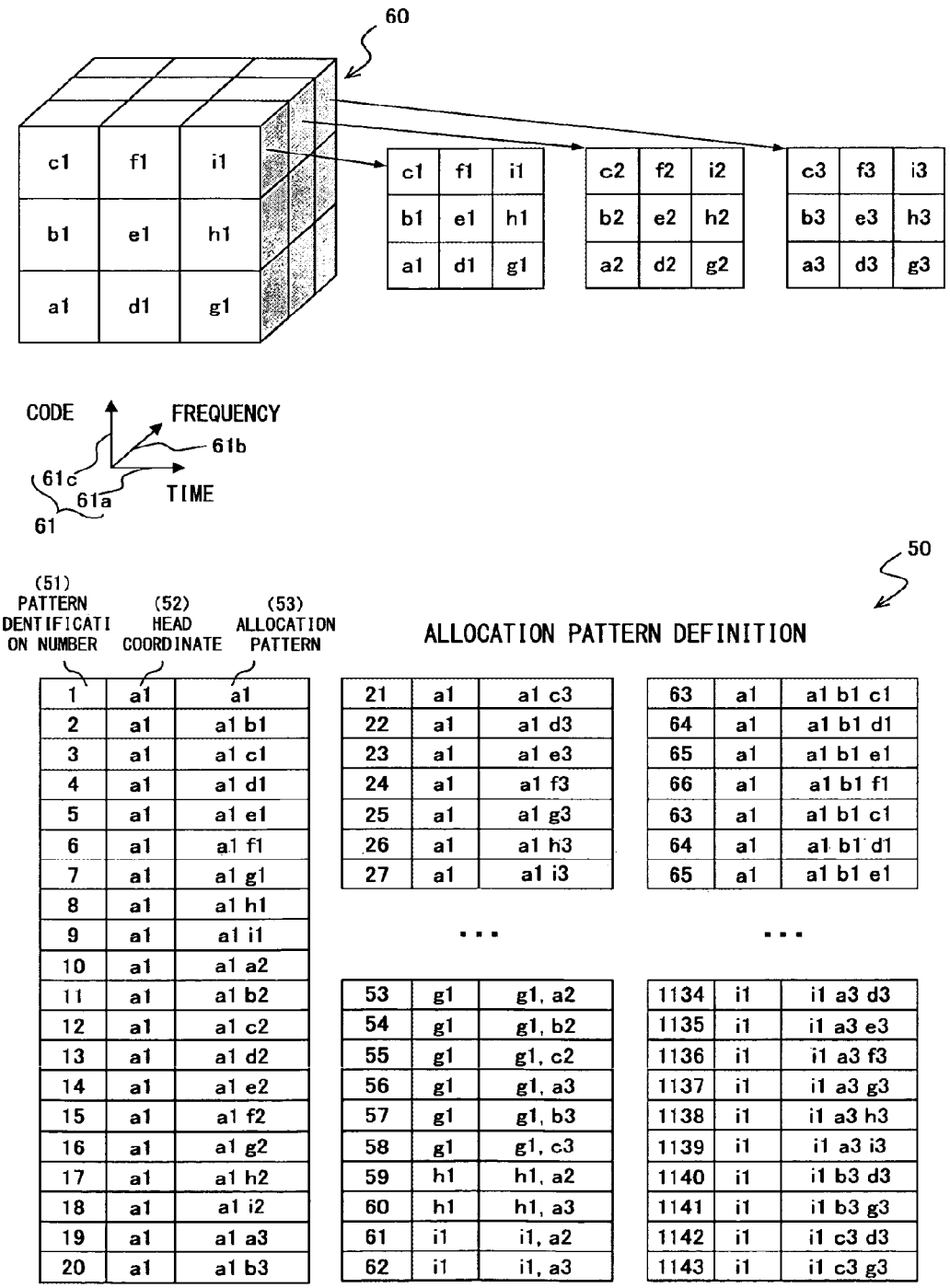
FIG. 16 is a conceptual diagram exemplifying a structure of an allocation pattern definition table and resource memory (i.e., a resource space) in the case of using frequency, time, and code as resources.

Next, an example of using frequency, time, and code as resources is shown. FIG. 16 exemplifies a correlation between the allocation definition table 50 and resource memory 60 in the resource space 61 in the case of using time, frequency and code as resource. Here, in the resource space 61, the first coordinate axis 61*a* is the time axis, the second coordinate axis 61*b* is the frequency axis and the third coordinate axis 61*c* is the code axis. The resource space 61 is constituted by zones as a result of time being divided into units of time, frequency being divided into units of frequency band, and further divided for each code series; and then a combination of three items, i.e., frequency, time, and code, is expressed by a resource allocation pattern 53 that is allocated to a user, as a resource, in accordance with the requested resource. It is also possible for a resource space to be expressed by a coordinate, the head slot is determined, and other slots are expressed by relative coordinates, for a resource allocation pattern 53.

Figure 17:
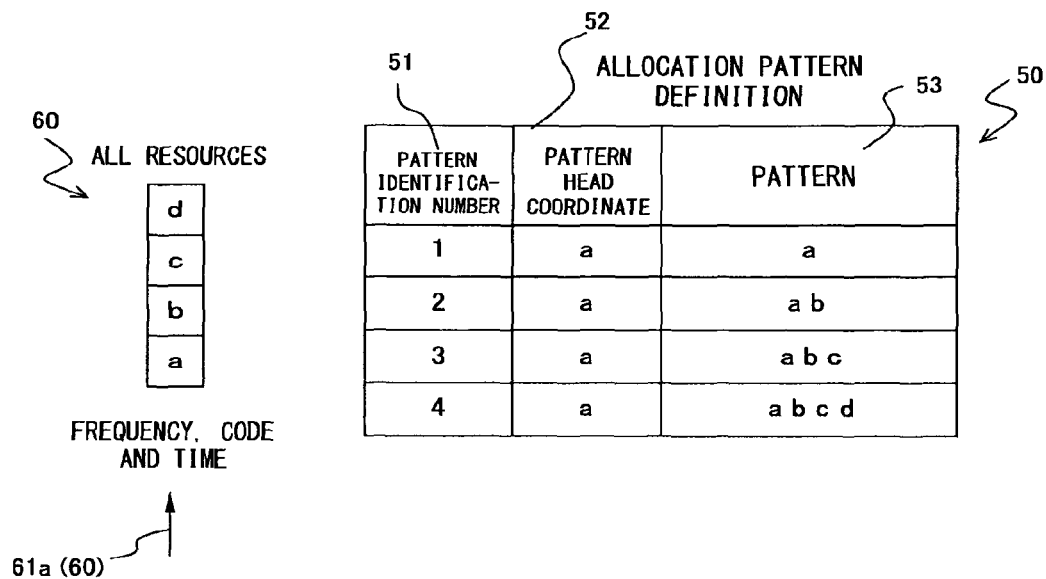
FIG. 17 is a conceptual diagram exemplifying a structure of an allocation pattern definition table and resource memory (i.e., a resource space) in the case of allocating plural pieces of individual slots of frequency, time, and code.

FIG. 17 exemplifies a correlation between the allocation definition table 50 and resource memory 60 when allocating adjacent slots in the case of allocating plural pieces of individual slots of frequency, time, and code.

As an example, when the time axis is set as the first coordinate axis and allocating a plurality of time slots, only the time slots that are temporally adjacent can be set as an allocation pattern. In this case, the number of resource allocation patterns 53 is reduced and therefore the pattern identification number 51 becomes smaller, thereby making it possible to reduce the amount of control information such as the allocation notification information 70 to be reported to the mobile station 40.

Likewise, in FIG. 17, the first coordinate axis 61*a* is set as the frequency axis and only adjacent resources in the frequency direction can be set as an allocation pattern. This reduces the number of resource allocation patterns 53, making the pattern identification number 51 smaller, thereby making it possible to reduce the amount of control information such as the allocation notification information 70 to be reported to the mobile station 40.

Further likewise in FIG. 17, in the case in which the first coordinate axis 61*a* is set as the code axis in place of the frequency and the code is used as a resource, it is possible to use resource allocation patterns 53 designating a resource continuing in the code axis direction.

Figure 18:
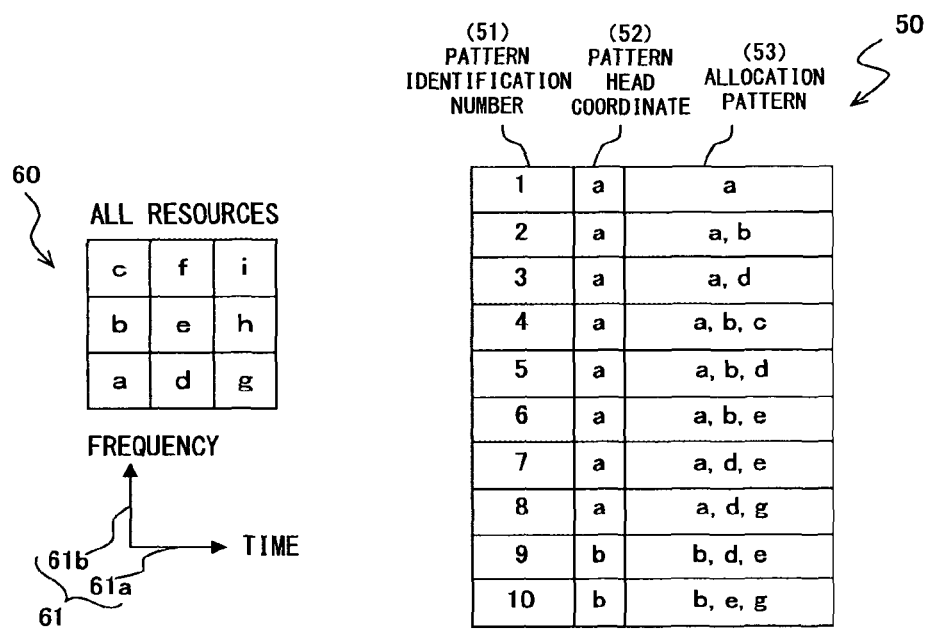
FIG. 18 is a conceptual diagram showing an allocation pattern definition table configured to specify only adjacent resources in the case of specifying two resources, i.e., frequency and time.

FIG. 18 exemplifies a correlation between the allocation definition table 50 and resource memory 60 when specifying only adjacent resources in the direction of frequency or time in the case of specifying two items, i.e., the frequency and time, as resource 60*a*.

Also, this case decreases the number of resource allocation patterns 53, making the pattern identification number 51 smaller, thereby making it possible to further reduce the amount of control information such as the allocation notification information 70 to be reported to the mobile station 40.

Also, in the case of combining code and time, in place of frequency, and using the combination as a resource, a similar allocation pattern can be used.

Furthermore, in the case of using all items, i.e., frequency, time, and code, only adjacent resources can be used as an allocation pattern.

FIG. 19 exemplifies a case of a resource allocation pattern 53 specifying only adjacent resources in the direction of frequency, time or code. Also, this case decreases the number of resource allocation patterns 53, making the pattern identification number 51 smaller, thereby making it possible to further reduce the amount of control information such as the allocation notification information 70 to be reported to the mobile station 40.

Figure 20:
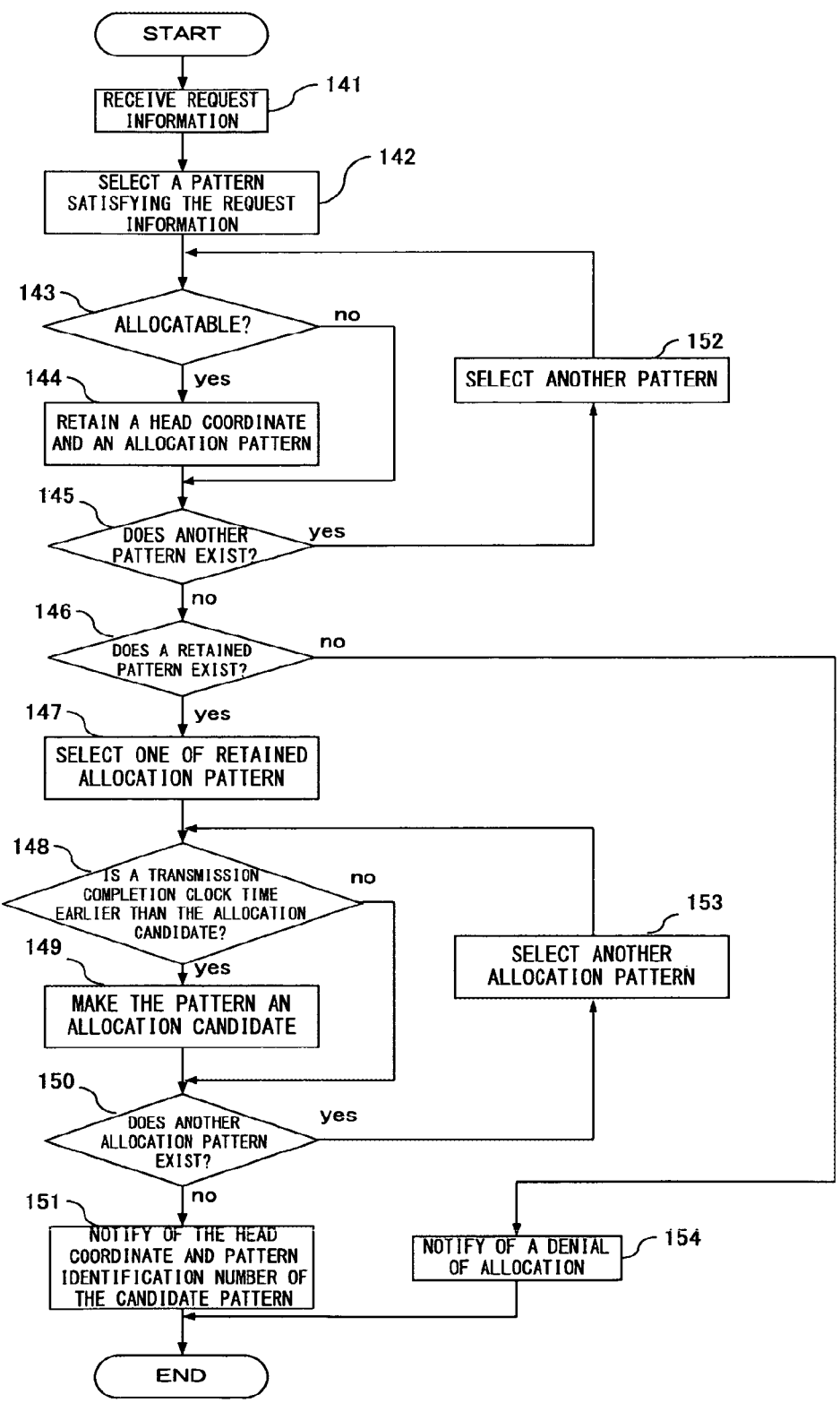
FIG. 20 is a flow chart exemplifying a resource allocation method in the case of placing a transmission completion clock time in priority.

FIG. 20 is a flow chart exemplifying a resource allocation method in the case of a resource allocation pattern 53 specifying a combination of resources 60*a* indicating an earlier transmission completion clock time.

Having received allocation request information 80 at the base station 30 (step 141), it searches for a resource allocation pattern 53 satisfying the allocation request information 80 from among the patterns pre-defined within the allocation pattern definition table 50 (step 142), judges whether or not it is possible to allocate a resource by making a comparison with the spare resources (steps 143 and 144), and keeps searching for resource allocation patterns 53 while selecting another resource allocation pattern 53 (step 152) until an allocatable resource allocation pattern 53 is found (step 145).

If a plurality of allocatable resource allocation patterns 53 are found (steps 146 and 147), the base station 30 determines the pattern indicating the earliest transmission completion clock time as an allocation pattern.

That is, it selects one of the plurality of resource allocation patterns 53 retained in step 144 (step 147) and, if the transmission completion clock time is earlier than the allocation candidate, an operation for selecting the present resource allocation pattern as an allocation candidate (step 149) is repeated for all allocatable resource allocation patterns 53 (steps 150 and 153).

Then, the base station 30 sets the resource allocation pattern 53 in the allocation pattern identification number 71 of the allocation notification information 70, sets the allocation startup coordinate 62 within the resource space 61 in the allocation startup coordinate 72, and notifies the mobile station 40 of the set resultant (step 151).

If step 146 does not find a single candidate for an allocatable resource allocation pattern 53, it notifies the mobile station 40 of a denial of allocation (step 154).

Figure 21:
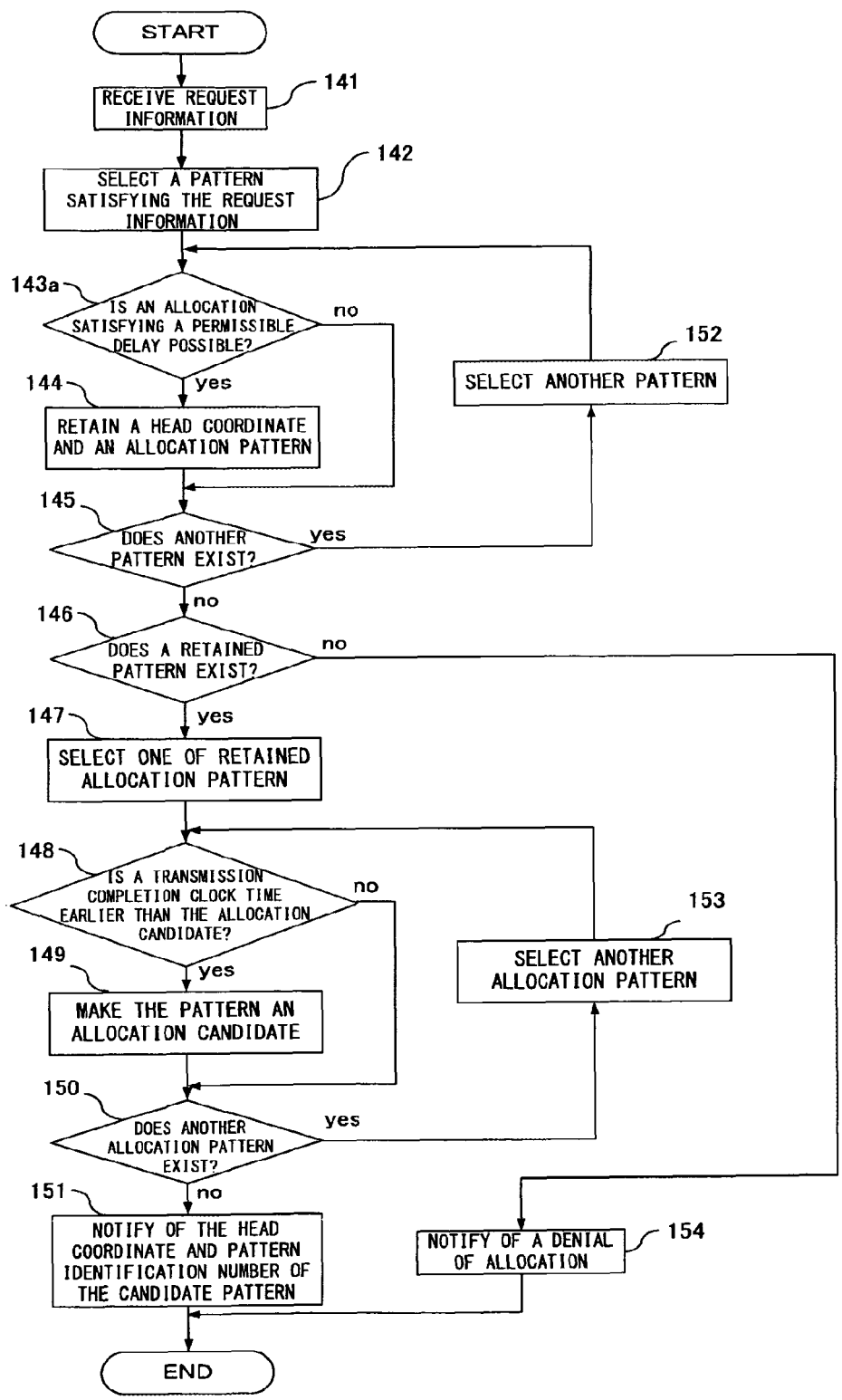
FIG. 21 is a flow chart exemplifying a resource allocation method allocating a combination of resources which satisfy a required permissible delay and of which the transmission completion clock time is the earliest.

FIG. 21 is a flow chart exemplifying a resource allocation method allocating a combination of resources that satisfy a required permissible delay and of which the transmission completion clock time is the earliest. In this case, it is judged whether or not there exists an allocation satisfying the required permissible delay in step 143a, which differs from step 143 of the flow chart shown in the above described FIG. 20.

That is, having received a requested resource amount 81 and a permissible delay time 82 as the allocation request information 80 in this case (step 141), the base station 30 searches for a resource allocation pattern 53 satisfying the requested resource amount 81 from among the pattern predefined in the allocation pattern definition table 50 (step 142), judges whether an allocation is possible by making a comparison with spare resources within the resource memory (steps 143a and 144), and keeps searching until an allocatable allocation pattern satisfying the permissible delay is found (steps 145 and 152).

If a plurality of allocatable patterns is found, the base station 30 selects the resource allocation pattern 53 that has the earliest transmission completion clock time (steps 147, 148, 149, 150 and 153). Then, it sets the resource allocation pattern 53 in the allocation pattern identification number 71 of the allocation notification information 70, sets the allocation startup coordinate 62 in the allocation startup coordinate 72, and notifies the mobile station 40 of the set resultant (step 151).

Contrarily, if step 146 does not find a single candidate for an allocatable resource allocation pattern 53, it notifies the mobile station 40 of a denial of allocation (step 154).

Note that the description of the radio resource allocation method described above shows the case of selecting a resource allocation pattern 53 at first, then judging whether the resource allocation pattern 53 matches with spare resources within the resource space 61 in the resource memory 60, and then determining the resource allocation pattern 53; a reverse case is also conceivable, however.

Figure 22:
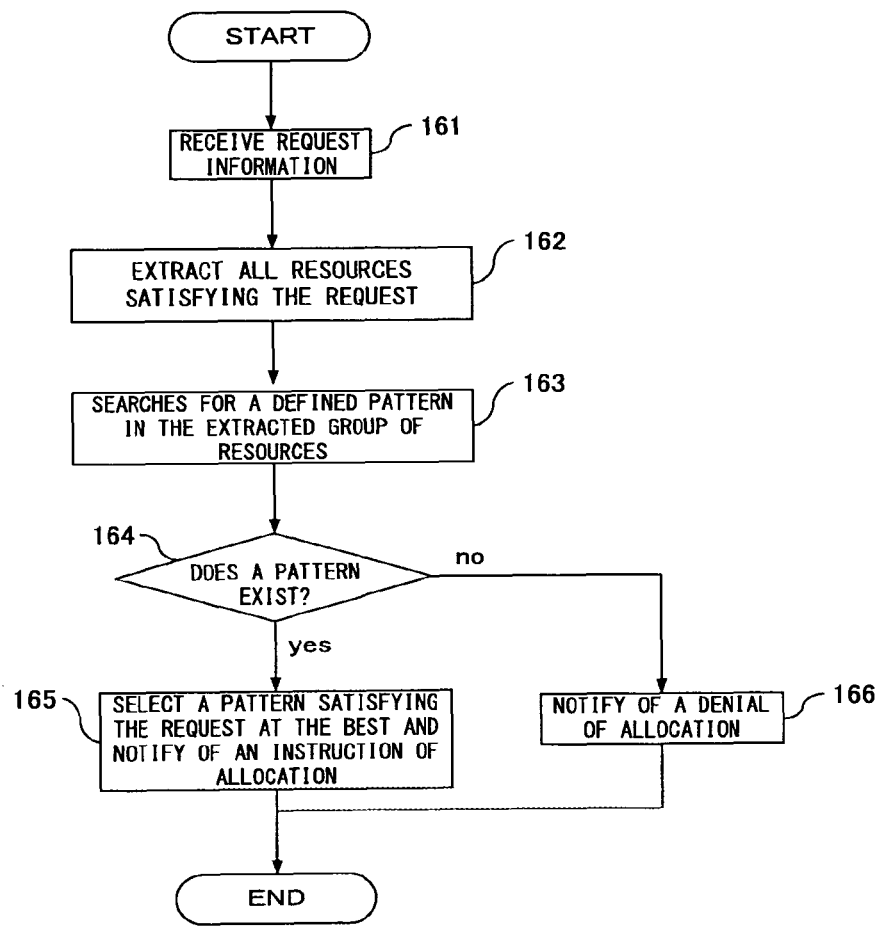
FIG. 22 is a flow chart showing a modified embodiment of a resource allocation method according to a preferred embodiment of the present invention.

That is, as exemplified in the flow chart of FIG. 22, having received the allocation request information 80 from the mobile station 40 (step 161), the base station 30 first extracts, from the resource memory 60, all resources 60a satisfying the request (step 162), searches, from among the extracted group of resources, for the existence of a group of resources 60a that are in a positional relationship matching a resource allocation pattern 53 pre-defined in the allocation pattern definition table 50 (step 163), judges the existence or nonexistence of a matching resource allocation pattern 53 (step 164) and, if a matching (one or a plurality of) resource allocation pattern 53 is found, selects the resource allocation pattern 53 satisfying the request the best, then sets the pattern identification number 51 in the allocation pattern identification number 71 of the allocation notification information 70, setting the startup coordinate 62 within the resource space 61 in the allocation startup coordinate 72 and notifying the mobile station 40 of the set resultant.

As such, the examples of the embodiment are described for the configuration of the base station including the resource allocation unit; it is, however, possible to embody the present invention by configuring it to include in the above described apparatus a resource allocation unit that manages the resources at the individual base stations integrally.

Note that the present invention can be changed variously within the scope thereof, in lieu of being limited to the configurations exemplified in the above embodiment.

The present invention is contrived to reduce the amount of information necessary to report a result of allocating a radio resource in a radio telecommunication carrying out an information telecommunication by reserving and allocating a radio resource.

It is also contrived to prevent a transmission delay of telecommunication information attributable to an increased amount of information required for reporting a result of allocating a radio resource in a radio telecommunication carrying out an information telecommunication by reserving and allocating a radio resource.

What is claimed is:

1. A method for allocating radio resources in a radio communication system in which a first radio communication apparatus and a second radio communication apparatus carry out a radio communication by using the radio resources being allocated, the method comprising:
   storing a plurality of resource allocation patterns present within a resource management space which are prepared in advance, a starting position of each of the plurality of resource allocation patterns, and pattern identifier information corresponding to each of the plurality of resource allocation patterns;
   selecting a resource allocation pattern among the plurality of resource allocation patterns which are prepared in advance, the resource allocation pattern specifying a combination of the radio resources within the resource management space; and
   notifying a pattern identifier information identifying the resource allocation pattern being selected and a starting position information indicating a starting position of the resource allocation pattern being selected, to the second radio communication apparatus.

2. A communication apparatus, comprising:
   a storage configured to store a plurality of resource allocation patterns present within a resource management space which are prepared in advance, a starting position of each of the plurality of resource allocation patterns, and pattern identifier information corresponding to each of the plurality of resource allocation patterns;
   a controller configured to select a resource allocation pattern among a plurality of resource allocation patterns, the resource allocation pattern specifying a combination of the radio resources within the resource management space and to notify a pattern identifier information identifying the resource allocation pattern being selected and a starting position information indicating a starting position of the resource allocation pattern being selected within the resource management space, to the second radio communication apparatus.

* * * * *